United States Patent [19]

Matsumoto et al.

[11] Patent Number: 4,876,185

[45] Date of Patent: Oct. 24, 1989

[54] ALUMINUM SUPPORT FOR A PHOTOCONDUCTIVE MEMBER

[75] Inventors: Yasuyuki Matsumoto, Toride; Keiichi Murai, Kashiwa; Tadaji Fukuda, Yokohama; Kyosuke Ogawa, Tokyo, all of Japan

[73] Assignee: Canon Kabushiki Kaisha, Tokyo, Japan

[21] Appl. No.: 71,648

[22] Filed: Jul. 9, 1987

Related U.S. Application Data

[60] Division of Ser. No. 873,444, Jun. 6, 1986, Pat. No. 4,702,981, which is a continuation of Ser. No. 599,522, Apr. 12, 1984, abandoned.

[30] Foreign Application Priority Data

Apr. 18, 1983 [JP] Japan .................................. 58-67029

[51] Int. Cl.$^{4}$ .......................... B21H 1/18; B32B 15/20

[52] U.S. Cl. .................................... 430/580; 428/577; 428/650; 420/528; 420/542; 420/547; 420/550

[58] Field of Search ............... 420/528, 542, 547, 550; 428/577, 580, 650

[56] References Cited

U.S. PATENT DOCUMENTS

| | | | |
|---|---|---|---|
| 2,058,429 | 10/1936 | Edwards | 420/542 X |
| 3,312,535 | 4/1967 | Anderson et al. | 428/650 X |
| 3,720,508 | 3/1973 | Brock et al. | 420/538 X |
| 3,911,819 | 10/1975 | Pryor et al. | 420/533 X |
| 4,078,924 | 3/1978 | Keddie et al. | 430/127 |
| 4,134,763 | 1/1979 | Fujimura et al. | 430/69 |
| 4,394,425 | 7/1983 | Shimizu et al. | 430/65 |
| 4,394,426 | 7/1983 | Shimizu et al. | 430/65 |
| 4,409,308 | 10/1983 | Shimizu et al. | 430/65 X |
| 4,420,546 | 12/1983 | Kanbe et al. | 430/65 X |
| 4,443,529 | 4/1984 | Kanbe et al. | 430/65 |
| 4,451,546 | 5/1984 | Kawamura et al. | 430/69 |
| 4,491,626 | 1/1985 | Kawamura et al. | 430/57 X |
| 4,634,656 | 1/1987 | Ohashi et al. | 420/547 X |

FOREIGN PATENT DOCUMENTS

| | | | |
|---|---|---|---|
| 1492243 | 7/1967 | France | 420/542 |
| 53-13423 | 2/1978 | Japan | 430/69 |
| 53-107657 | 9/1978 | Japan | 420/528 |
| 54-107816 | 8/1979 | Japan | 420/542 |
| 432964 | 8/1935 | United Kingdom | 420/542 |

*Primary Examiner*—Roland E. Martin
*Attorney, Agent, or Firm*—Fitzpatrick, Cella, Harper & Scinto

[57] ABSTRACT

A photoconductive member has a support comprising aluminum as the main component and a photoconductive layer. The photoconductive layer is provided on the support and contains an amorphous material comprising silicon atoms as a matrix. The support comprises an aluminum alloy with a Fe content of 2000 ppm by weight or less.

3 Claims, 1 Drawing Sheet

ALUMINUM SUPPORT FOR A PHOTOCONDUCTIVE MEMBER

This is a division of application Ser. No. 873,444, filed June 6, 1986, now U.S. Pat. No. 4,702,981, which in turn is a continuation of application Ser. No. 599,522, filed Apr. 12, 1984, now abandoned.

BACKGROUND OF THE INVENTION

1. Field of the Invention

This invention relates to a photoconductive member having sensitivity to electromagnetic waves such as light (herein used in a broad sense, including ultra-violet rays, visible light, infrared rays, X-rays and gamma-rays) and a support for said photoconductive member, particularly to an improved support and a photoconductive member having said support, which is suitable for use as a photosensitive member for electrophotography.

2. Description of the Prior Art

Amorphous silicon (hereinafter referred to as a-Si) in which dangling bonds are modified with monovalent elements is expected to be applied for an image forming member for electrophotography due to its excellent photoconductivity, friction resistance and heat resistance. Also, a-Si causes substantially no problem in environmental sanitation during preparation thereof, and, in addition, enlargement of area of a photosensitive member can also be made easily to an advantage in application.

However, a-Si alone may be sometimes slightly lower in dark resistance for use in a photosensitive member for electrophotography. Accordingly, this problem is generally solved by arrangement of an impeding layer for impeding charge injection from the support or by doping with an additive. There is a further problem that the surface becomes more affinitive for water since oxide film of $SiO_x$ will naturally be formed on a-Si surface under the environment under which an electrophotographic device is generally placed. If the device is used under such a state for an electrophotographic process in which corona discharging is frequently used, the surface charges will migrate on the surface of the photosensitive member under highly humid conditions, whereby a conventionally called unfocused image will be formed. For prevention of this, as the surface protective layer, $SiN_x$, $SiC_x$, etc. are arranged, and further a reflection prevention layer, a light absorbing layer, an adhesion layer, etc. are frequently provided, if necessary.

Thus, for providing a-Si in practical application as an electrophotographic photosensitive member, many kinds of gases are required to be employed to form the photoconductive member with a multi-layer constitution suitable for the purpose to a size useful as the electrophotographic photosensitive member. And, evenness of the photoconductive member in this case is very important. For example, if unevenness in photoconductive characteristics or defect such as pinhole exists, not only no beautiful image can be provided, but also such a photoconductive member is no longer useful in practical application.

The film morphology of a-Si is known to be greatly influenced by the surface shape of a support. In a photosensitive drum for electrophotography with a large area for which substantially the same photoconductive characteristics are required at almost all places, the surface condition of a support is very important, and presence of a projection or a recess on the surface of a support will impair the evenness of the film, whereby columnar structure or spherical projection may be formed to cause photoconductive unevenness.

Aluminum is a material which is preferable in many respects as a support for a photoconductive member, particularly a support as a photosensitive member for electrophotography. However, for the purpose of using an aluminum base material as the support, its surface is subjected to mirror finishing. In this process, there ensue various problems due to presence of hard portions called a hard spot. More specifically, this hard spot will make a cutting resistance against a cutting tool in the process of mirror finishing of the surface of the support, which may cause generation of failures on the surface of aluminum cylinder. For example, it may cause cracks of about 1 to 10 μm, crater-like flaws, and further minute projection and recesses.

The present inventors have made extensive studies on this problem and consequently found that the hard spot, which is the cause of failures in the process of cutting of the surface of the support, is due to the impurity of various elements, including Fe, Ti and Si contained in aluminum. Among these impurities, particularly Fe will difficultly form a solid solution with aluminum, but forms an intermetallic compound of Fe-Al or Fe-Al-Si, which is dispersed as the hard spot in the aluminum matrix, and occurrence of this hard spot will be markedly increased at a specific Fe content or higher. It has also been found that Mg content within aluminum alloy is also concerned with the cutting characteristic of the aluminum alloy.

The present invention has been accomplished in view of the various points as described above, and it is based on a discovery that a photoconductive member excellent in evenness in photoconductive characteristics can be obtained by use of an aluminum alloy having a specific composition as the support for a-Si deposited film.

SUMMARY OF THE INVENTION

An object of the present invention is to provide a photoconductive member which is excellent in evenness of electrical, optical and photoconductive characteristics.

Another object of the present invention is to provide a photoconductive member for electrophotography which can give an image of high quality with little image defect.

Still another object of the present invention is to provide a photoconductive member, having a support comprising aluminum as the main component and a photoconductive layer which is provided on the support and contains an amorphous material comprising silicon atoms as a matrix, said support comprising an aluminum alloy with a Fe content of 2000 ppm by weight or less.

Still another object of the present invention is to provide a support for photoconductive member, comprising an aluminum alloy with a Fe content of 2000 ppm by weight or less.

According to one aspect of the present invention, there is provided a photoconductive member, having a support comprising aluminum as the main component and a photoconductive layer which is provided on the support and contains an amorphous material comprising silicon atoms as a matrix, said support comprising an aluminum alloy with a Fe content of 2000 ppm by weight or less.

According to another aspect of the present invention, there is provided a support for photoconductive member, comprising an aluminum alloy with a Fe content of 2000 ppm by weight or less.

DETAILED DESCRIPTION OF PREFERRED EMBODIMENT

Figure 1:
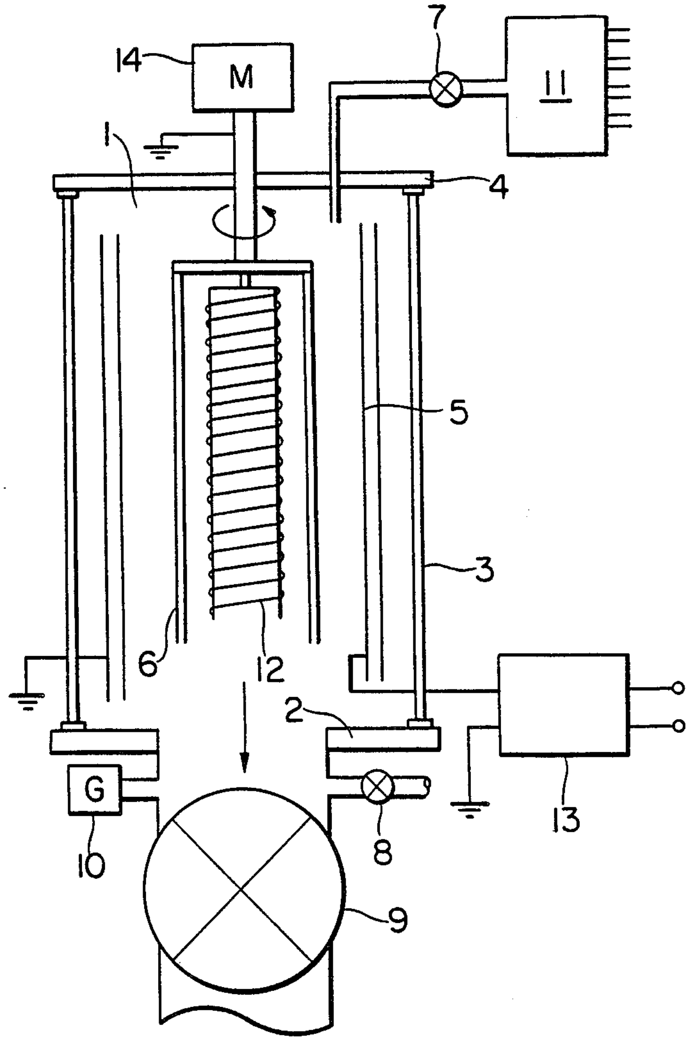
FIG. 1 shows a device for preparation of a photoconductive member according to the glow discharge decomposition method.

The photoconductive member of the present invention is constituted of a support made of an aluminum alloy and a photoconductive member, provided on the support, which contains an amorphous material comprising silicon atoms as the matrix, preferably containing at least one of hydrogen atoms and halogen atoms as constituent atoms. Said photoconductive layer may have a barrier layer in contact with the support, and further a surface barrier layer on the surface of said photoconductive layer.

The support in the photosensitive member of the present invention is made of an aluminum alloy with a Fe content of 2000 ppm by weight or less. Extended materials of aluminum alloy for general purpose contain generally about 0.15% to 1.0% of Fe as impurity. Fe has a low solid solubility in aluminum in forming a solid solution, and is liable to form an intermetallic compound such as Fe-Al or Fe-Al-Si, thus appearing as the hard spots in aluminum matrix. Particularly, this hard spot will be abruptly increased with the increase of Fe content around 2000 ppm as the critical boundary, and has bad effect on mirror finish cutting of the support surface. Since the irregularity on the support surface will produce very sensitively an adverse effect on the photoconductive characteristics of the deposited Si film, it is required to be controlled very severely. The content of Fe in the aluminum alloy is more preferably 1000 ppm by weight or less.

Concerning the cutting characteristic for mirror finish of the aluminum alloy, Mg content in the aluminum alloy has also a synergetic action, whereby the cutting characteristic of the aluminum alloy can be improved by permitting Mg to coexist in the alloy, and the latitude of Fe content in the alloy can be broadened. The content of Mg in the aluminum alloy may preferably be in the range from 0.5% to 10% by weight, particularly preferably from 1% to 5% by weight. If Mg content is very high, undesirable grain boundary corrosion will tend to occur at the crystal grain boundary portions.

The support may have a shape as desired. For example, to be used for electrophotography, in the case of successive high speed copying, it should desirably be formed into an endless belt or a cylinder. The support may have a thickness suitably determined so that the photoconductive member as desired may be formed. When flexibility is required as the photoconductive member, it is made as thin as possible within the range in which it can sufficiently exhibit the function of a support. However, in such a case in view of preparation and handling of the support and further of mechanical strength, the support is made to have a thickness preferably of 10 μm or more.

Examples of the halogen atoms which may be contained in the photoconductive layer of the photoconductive member of the present invention may include fluorine, chlorine, bromine and iodine, particularly preferably chlorine and fluorine, above all fluorine. As other components than silicon atoms, hydrogen atoms and halogen atoms to be contained in the photoconductive layer, there may be contained as the component for controlling the Fermi level or the forbidden band gap the group III atoms of the periodic table such as boron, gallium, etc. the group V atoms of the periodic table such as nitrogen, phosphorus, arsenic, etc., oxygen atoms, carbon atoms, germanium atoms, either singly or in a suitable combination.

A barrier layer is provided for the purposes such as improvement of adhesion between the photoconductive layer and the support or controlling of the charge receiving ability, and depending on the purpose, a-Si layer or microcrystalline-Si layer containing the group III atoms of the periodic table, the group V atoms of the periodic table, oxygen atoms, carbon atoms, germanium atoms is formed in one layer or in multi-layer.

As the layer for preventing injection of surface charges or the protective layer, there may be provided on the photoconductive layer an upper layer comprising an upper layer of a-Si containing carbon atoms, nitrogen atoms, oxygen atoms preferably in large amounts, or a surface barrier layer comprising an organic high resistance material.

In the present invention, for formation of the photoconductive layer constituted of a-Si, vacuum deposition methods utilizing discharging phenomenon known in the art may be applicable, such as the glow discharging method, the sputtering method or the ion plating method.

An example of preparation of a photoconductive member formed according to the glow discharge decomposition is described below.

FIG. 1 shows a device for preparation of a photoconductive member according to the glow discharge decomposition method. The deposition chamber 1 is constituted of a base plate 2, a chamber wall 3 and a top plate 4. Within the deposition chamber 1, a cathode 5 is provided and the drum-shaped support 6 made of aluminum alloy having a specific composition for forming a-Si deposition film thereon is placed at the central portion of the cathode 5 and it also functions as the anode.

For formation of a-Si deposited film on the drum-shaped support by means of this preparation device, first with the inflow valve 7 for feed gas and the leak valve 8 being closed, the evacuating valve 9 is opened to evacuate the deposition chamber. When the vacuum gauge comes to read approximately $5\times10^{-6}$ Torr, the feed gas inflow valve 7 is opened to permit a starting gas mixture such as $SiH_4$ gas, $Si_2H_6$ gas, $SiF_4$ gas, etc. at a desired mixing ratio controlled in the massflow controller 11 to flow into the deposition chamber 1. The opening of the evacuating valve 9 is controlled by monitoring the vacuum indicator so that the pressure in the deposition chamber may be maintained at a desired value. And, after confirming that the surface temperature on the drum-shaped support 6 has been kept at a desired temperature by the heater 12, the high frequency power source 13 is set at a desired power to excite glow discharging in the deposition chamber 1.

During layer formation, in order to uniformize layer formation, the drum-shaped support 6 is rotated by a motor 14 at a constant speed. Thus, a-Si deposited film can be formed on the drum-shaped support 6.

The present invention is described in detail by referring to the following Examples.

Examples 1–3, Comparative Examples 1, 2

On a lathe equipped with an air dumper (produced by PNEUMO PRECLSION INC.) for precision cutting was set a diamond cutter with a curvature of 0.01 ($mm^{-1}$) at the tip so that a rake angle of minus 5° relative to the cylinder center angle may be obtained. Then, five kinds of cylinders made of aluminum alloys (each containing 4% Mg) with different Fe contents were vacuum chucked on the rotational shaft flange of this lathe, and mirror surface cutting was carried out thereon under the conditions of a circumferential speed of 1000 (m/min) and a feed speed of 0.01 (mm/R), while using in combination spraying of kerosene from a nozzle equipped at the lathe and suction of cut powder with a vacuum nozzle similarly equipped, to an outer diameter of 80 mm $\theta$. The cylinder thus worked to mirror surface was examined by a metal microscope for the number of the surface defects (crater-like flaws, cracks) formed after mirror surface working. The hard spots existing in the cylinders made of aluminum alloys before mirror surface finishing had also been examined according to the same method.

As the subsequent step, on the respective cylinders of aluminum alloys subjected to mirror surface working, by means of the preparation device shown in FIG. 1, according to the glow discharge decomposition method as described in detail above, a-Si deposited films were formed under the following conditions.

| Order of deposited layers | Starting gases employed | Layer thickness (μm) |
|---|---|---|
| First layer | $SiH_4$, $B_2H_6$ | 0.6 |
| Second layer | $SiH_4$ | 20 |
| Third layer | $SiH_4$, $C_2H_4$ | 0.1 |

Aluminum cylinder temperature: 250° C.
Deposition chamber pressure during deposition film formation: 0.3 Torr
Discharging frequency: 13.56 Hz
Deposited layer formation speed: 20 Å/sec
Discharging power: 0.18 W/cm$^2$ Each of these photosensitive drums was set on a copying device 400 RE produced by Canon K.K. to carry out image formation, and evaluation of image defects (0.3 mm or greater in diameter) was practiced. The results are shown in Table 1. For the electrophotographic photosensitive drums of Examples 1–3, 1,000,000 sheets of successive copying were tested for evaluation of durability each under the respective environments of 23° C. and relative humidity of 50%, 30° C. and relative humidity of 90%, and 5° C. and relative humidity of 20%. As the result, good durability was confirmed to be possessed by these drums, without any increase of image defect, particularly no increase of defect such as white drop-off being observed.

TABLE 1

| Example | Fe content (ppm) | Hard spot number (spots/mm$^2$) | Number of defects generated during mirror surface working (defects/mm$^2$) | Image defect (defects/A3) |
|---|---|---|---|---|
| Example 1 | 100 | 1 | 0 | 0 |
| Example 2 | 1000 | 20 | 10 | 5 |
| Example 3 | 2000 | 100 | 30 | 10 |
| Comparative | | | | |
| Example 1 | 3000 | 500 | 100 | 50 |
| Example 2 | 4000 | 2000 | 400 | 200 |

What we claim is:

1. In an electrophotographic support for a hydrogenated and/or halogenated amorphous silicon member, which support is mirror-finished employing a cutting tool, said support being subject to generation of failures on the surface thereof due to cutting resistance caused by the presence of hard spots therein, the improvement which comprises an aluminum allow with a Fe content of 2000 ppm by weight or less, said support being a cylinder having reduced numbers of hard spots and enhanced resistance to surface defects upon mirror-finish.

2. A support for an amorphous silicon photoconductive member according to claim 1, wherein the aluminum alloy has a Mg content of 0.5% to 10% by weight.

3. In an electrophotographic support for a hydrogenated and/or halogenated amorphous silicon member, which support is mirror-finished employing a cutting tool, said support being subject to generation of failures on the surface thereof due to cutting resistance caused by the presence of hard spots therein, the improvement which comprises an aluminum alloy with a Fe content of 2000 ppm by weight or less, said support being an endless belt having reduced numbers of hard spots and enhanced resistance to surface defects upon mirror-finishing.

* * * * *

UNITED STATES PATENT AND TRADEMARK OFFICE

CERTIFICATE OF CORRECTION

PATENT NO. : 4,876,185

DATED : October 24, 1989

INVENTOR(S) : YASUYUKI MATSUMOTO, ET AL.

It is certified that error appears in the above-identified patent and that said Letters Patent is hereby corrected as shown below:

COLUMN 5

Line 19, "80 mm θ." should read --80mm ϕ.--.
Line 49, "Table 1. For" should read --Table 1. ¶ For--.

COLUMN 6

Line 30, "aluminum allow" should read --aluminum alloy--.

Line 34, "ɨsh." should read --ishing.--.

Signed and Sealed this

Fourth Day of June, 1991

*Attest:*

HARRY F. MANBECK, JR.

*Attesting Officer* *Commissioner of Patents and Trademarks*